US012725960B2

(12) United States Patent
Hirabayashi et al.

(10) Patent No.: US 12,725,960 B2
(45) Date of Patent: Sep. 1, 2026

(54) CHARGING INLET AND METHOD OF ASSEMBLING A CHARGING INLET

(71) Applicant: Yazaki Corporation, Tokyo (JP)

(72) Inventors: Shintaro Hirabayashi, Kakegawa (JP); Shigeyuki Ogasawara, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 571 days.

(21) Appl. No.: 18/467,767

(22) Filed: Sep. 15, 2023

(65) Prior Publication Data

US 2024/0136757 A1 Apr. 25, 2024
US 2024/0235098 A9 Jul. 11, 2024

(30) Foreign Application Priority Data

Oct. 20, 2022 (JP) ................................ 2022-168139

(51) Int. Cl.

*H01R 13/506* (2006.01)
*B60L 53/16* (2019.01)
*H01R 43/18* (2006.01)
*H02J 7/70* (2026.01)

(52) U.S. Cl.

CPC ............ *H01R 13/506* (2013.01); *B60L 53/16* (2019.02); *H01R 43/18* (2013.01); *H02J 7/70* (2026.01)

(58) Field of Classification Search

CPC .. H01R 13/506; H01R 43/18; H01R 2201/26; H01R 13/465; H01R 13/5045; H01R 43/20; B60L 53/16; B60L 53/11; H02J 7/70; B60K 2015/0553; B60K 15/04; B60K 15/05; Y02T 90/14

USPC ......................................................... 320/107

See application file for complete search history.

(56) References Cited

U.S. PATENT DOCUMENTS 9,463,702 B2 * 10/2016 Fukushima .......... H01R 13/567
9,478,921 B2 * 10/2016 Osawa .................. H01R 13/42
10,739,035 B2 * 8/2020 Herweck .................. F24F 8/40
10,843,582 B2 * 11/2020 Feldner ............. H01R 13/6275
10,910,736 B2 * 2/2021 Kurita .................... H01R 13/42
11,025,018 B2 * 6/2021 Karasawa ................ B60K 1/00
2015/0137756 A1 * 5/2015 Fukushima .......... H01R 13/447 320/109

(Continued)

FOREIGN PATENT DOCUMENTS

JP 2014-099256 A 5/2014
JP 2017212132 A * 11/2017 ............. Y02T 90/12
KR 20190064906 A * 6/2019 ............ B60L 3/0092

*Primary Examiner* — M Baye Diao

(74) *Attorney, Agent, or Firm* — Sughrue Mion, PLLC

(57) ABSTRACT

A charging inlet includes: an inlet housing including a connection mechanism and a connection mechanism wall surface surrounding the connection mechanism, the connection mechanism being configured for connection to a partner connector; and a design cover including a design surface and a cover inner wall surface, the design surface having a hole in which the connection mechanism being exposed, wherein the cover inner wall surface faces the connection mechanism wall surface and the design cover is attached to the inlet housing with the design surface covering a circumferential outer region of the connection mechanism, wherein a plurality of crushed ribs is provided on the cover inner wall surface, the crushed ribs being in contact with the connection mechanism wall surface.

5 Claims, 6 Drawing Sheets

(56) References Cited

U.S. PATENT DOCUMENTS

| | | | |
|---|---|---|---|
| 2015/0229055 | A1 | 8/2015 | Fukushima et al. |
| 2020/0062111 | A1 | 2/2020 | Wang |

* cited by examiner

CHARGING INLET AND METHOD OF ASSEMBLING A CHARGING INLET

BACKGROUND OF THE INVENTION

Technical Field

The present invention relates to a charging inlet with an inlet housing and a design cover.

Background Art

A charging inlet is used as a vehicle connector for charging a battery from an external power supply, the battery installed e.g. in an electric vehicle (EV) or plug-in hybrid electric vehicle (PHV). As described in Patent Document 1, the charging inlet includes a mechanism for accommodating a plurality of terminals, wherein the mechanism complies with a charging standard for connection to the charging connector.

CITATION LIST

Patent Literature

Patent Document 1: JP 2014-099256 A

SUMMARY OF THE INVENTION

For commercializing charging inlets, it is useful to separate a design section and a functional section of each charging inlet in order to accomplish standardization and customization for individual vehicle types.

For example, as shown in FIG. 6, a charging inlet 300 may be configured by generalizing an inlet housing 310 as an independent functional section and by attaching a separate design cover 320 to the inlet housing 310 to facilitate customization for individual vehicle types, wherein the inlet housing 310 accommodates terminals and includes a connection mechanism 311 formed therein, which is configured for connection to a partner connector. In this case, the design cover 320 covers a circumferential outer region 312 of the connection mechanism 311 formed in the inlet housing 310 so that a design surface 321 of the design cover 320 is exposed to the outside for improvement of the exterior appearance.

Attachment of the design cover 320 to the inlet housing 310 may be provided e.g. by means of a fitting system, wherein flexible lock hole elements 322 are formed in the design cover 320 and a plurality of snap fit mechanisms with claws 313 formed in the inlet housing 310 is provided in a plurality of locations of the inlet housing 310 to fix the design cover 320 to the inlet housing 310.

In the case where a lock mechanism such as a snap fit mechanism is utilized, a gap is configured between the design cover 320 and the inlet housing 310 as a clearance for fitting the design cover 320 into the inlet housing 310.

Although the gap is required for manufacturing, this gap may cause instability of the design cover 320 to generate abnormal noises. In addition, the design cover 320 may be displaced to one side, which may result in an ununiform gap around the connection mechanism 311 and deterioration of the design of the charging inlet.

Furthermore, such displacement of the design cover 320 due to the gap may result in unbalanced engaged portions of the snap fit mechanisms in the plurality of locations, which may reduce a holding force of the lock.

On the other hand, if no gap is provided between the design cover 320 and the inlet housing 310, this may adversely affect the assemblability during production of the charging inlet 300.

Therefore, an objective of the present invention is to provide a charging inlet with an inlet housing and a design cover which has an improved stability of the design cover against the inlet housing without reduction of assemblability.

In order to achieve the above objective, a charging inlet according to an aspect of the present invention includes: an inlet housing including a connection mechanism and a connection mechanism wall surface surrounding the connection mechanism, the connection mechanism being configured for connection to a partner connector; and a design cover including a design surface and a cover inner wall surface, the design surface having a hole in which the connection mechanism being exposed, wherein the cover inner wall surface faces the connection mechanism wall surface and the design cover is attached to the inlet housing with the design surface covering a circumferential outer region of the connection mechanism, wherein a plurality of crushed ribs is provided on the cover inner wall surface, the crushed ribs being in contact with the connection mechanism wall surface.

In this aspect, the invention can achieve a charging inlet with an inlet housing and a design cover which has an improved stability of the design cover against the inlet housing without reduction of assemblability.

In order to achieve the above objective, a method of assembling a charging inlet according to an aspect of the present invention includes: fitting a design cover into an inlet housing, the inlet housing including a connection mechanism and a connection mechanism wall surface surrounding the connection mechanism, wherein connection mechanism is configured for connection to a partner connector, wherein the design cover includes a design surface and a cover inner wall surface, wherein the design surface has a hole for exposing the connection mechanism and the cover inner wall surface includes a plurality of ribs, wherein the fitting the design cover into the inlet housing is performed such that the design surface covers a circumferential outer region of the connection mechanism and the cover inner wall surface faces the connection mechanism wall surface to crush the plurality of the ribs via contact of the plurality of ribs with the connection mechanism wall surface.

In this aspect, the invention can achieve a method of assembling a charging inlet with an inlet housing and a design cover which has an improved stability of the design cover against the inlet housing without reduction of assemblability.

DETAILED DESCRIPTION OF PREFERRED EMBODIMENTS

Figure 1:
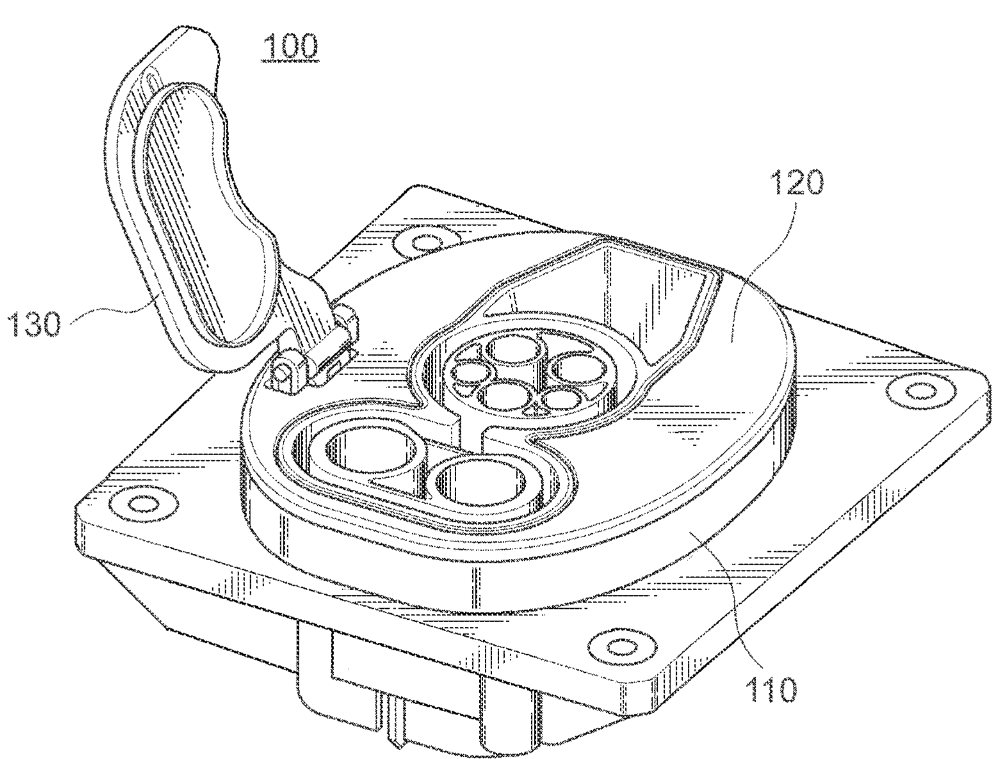
FIG. 1 shows a perspective view of a charging inlet according to an embodiment.

Embodiments of the present invention will be described in details with reference to the Drawings. FIG. 1 shows a perspective view of a charging inlet 100 according to an embodiment; In the example according to this figure, the charging inlet 100 is provided in a socket form according to Type 1 of the Combined Charging System (CCS). However, the charging inlet 100 may be also provided in socket forms according to other charging standards.

The charging inlet 100 is a component which is used e.g. in an electric vehicle (EV) or plug-in hybrid electric vehicle (PHV), for example for charging a battery installed in a vehicle body from an external power supply. As shown in FIG. 1, the charging inlet 100 includes an inlet housing 110, a design cover 120, and a DC socket cap 130.

Figure 2:
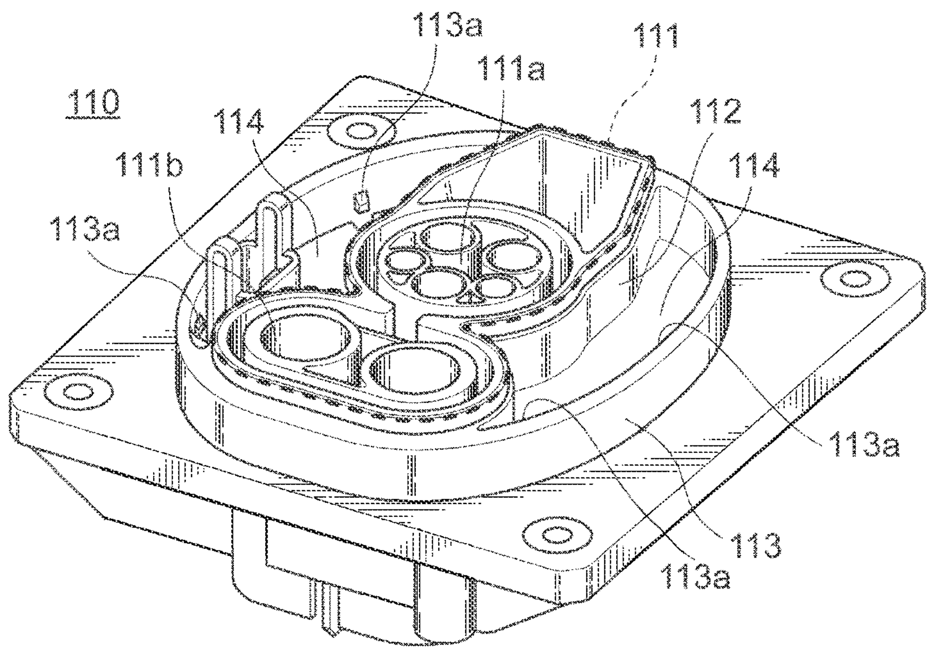
FIG. 2 shows an inlet housing according to the embodiment.

As shown in FIG. 2, the inlet housing 110 includes a socket section 111 as a connection mechanism for connection with a partner connector, a socket section wall surface 112 surrounding the socket section 111, an outer wall 113 formed more outwardly than the socket section wall surface 112, and a circumferential outer region 114, wherein the circumferential outer region 114 is provided between the socket section wall surface 112 and the outer wall 113. The socket section 111 is raised than the circumferential outer region 114, wherein the resulting height difference forms the socket section wall surface 112. The inlet housing 110 is made of e.g. insulating resin.

The socket section 111 has a shape complying with a charging standard, and accommodates a plurality of terminals required for charging. In the case according to FIG. 2, the socket section 111 includes an AC socket 111*a* and a DC socket 111*b*, wherein when viewed in a direction of connection to the partner connector, the socket section 111 has a contour formed by two substantial ellipses connected in a T-shape. It should be noted that the DC socket cap 130 which serves as a cap for the DC socket 111*b* is not directly so relevant to the present invention, and therefore, shall not be described below.

The socket section wall surface 112 is a wall surface which extends in parallel to the direction of connection to the partner connector and is oriented outwardly, wherein the socket section wall surface 112 forms a contour of the socket section 111. The socket section wall surface 112 functions as a connection mechanism wall surface.

The outer wall 113 is a wall extending upward in parallel to the direction of connection to the partner connector and has a substantially elliptical contour as viewed in the direction of connection to the partner connector. An region outside the outer wall 113 is configured as an attachment mechanism for attachment to a vehicle, the attachment mechanism being configured to be hidden by a vehicle body to which it is intended to be attached. The claws 113*a* of the snap fit mechanisms are formed in four locations on an inner surface of the outer wall 113 so as to be oriented inwardly.

Figure 3:
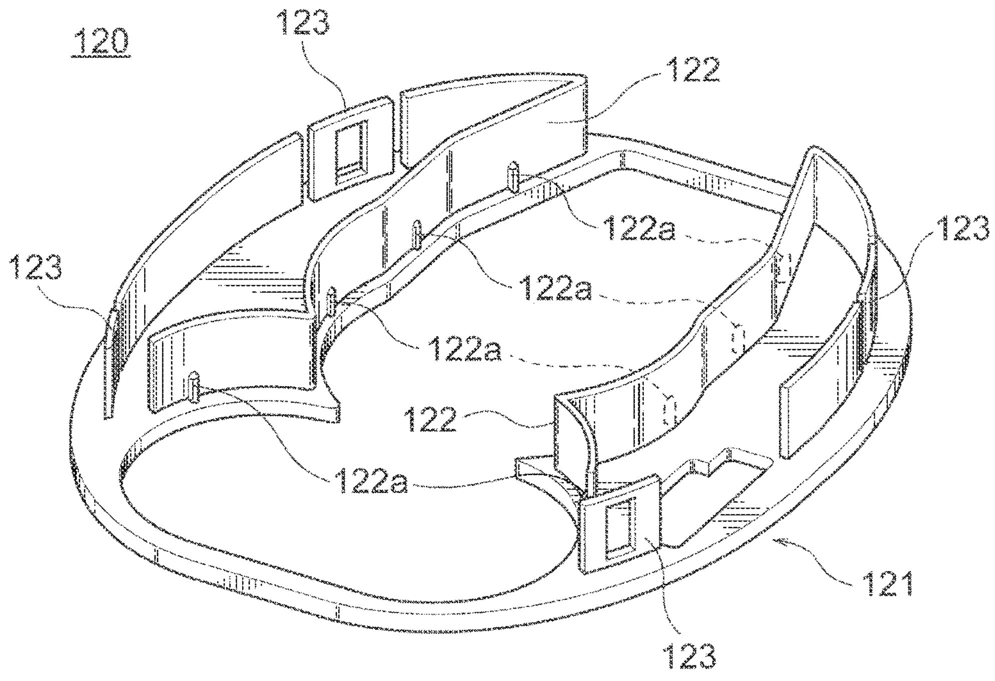
FIG. 3 shows a design cover according to the embodiment.

As shown in FIG. 3, the design cover 120 includes a design surface 121, cover inner wall surfaces 122, and flexible lock hole elements 123. It is to be noted that this figure shows a view of the design cover 120 from its back surface. The design cover 120 is made of e.g. insulating resin.

The design surface 121 is exposed to the outside. The charging inlet 100 can be easily customized for individual vehicle types by changing the design surface 121 of the design cover 120 in its exterior appearance. The design surface 121 has an elliptical contour adapted to the outer wall 113 of the inlet housing 110. The design surface 121 has a hole formed therein which is adapted to the contour of the socket section 111. This hole is configured to expose the socket section 111 to the outside.

The cover inner wall surfaces 122 are inner surfaces of walls which extend orthogonally to the design surface 121. The cover inner wall surfaces 122 are formed so as to face the socket section wall surface 112 of the inlet housing 110. In the present embodiment, a pair of cover inner wall surfaces 122 is formed with the socket section 111 interposed therebetween.

A plurality of crushed rib 122*a* are formed on the cover inner wall surfaces 122. The crushed ribs 122*a* are formed in the form of ribs at the time of forming the design cover 120. When the design cover 120 is fitted into the inlet housing 110, the crushed ribs 122*a* come into contact with the socket section wall surface 112 of the inlet housing 110 to be crushed and plastically deformed. For this reason, the design cover 120 is made of a softer material than the inlet housing 110.

Before being crushed, the crushed ribs 122*a* has a thickness (in a direction parallel to the design surface) that is larger than the gap between the inlet housing 110 and the design cover 120 according to setting. Before being crushed, it is desirable that all the crushed ribs 122*a* have a common height (in a direction perpendicular to the design surface) and tapered tips in order to improve operability and center alignment. It is further desirable that the crushed ribs 122*a* are formed to be in contact with a back surface of the design surface 121.

According to the present embodiment, four crushed rib 122*a* are formed on each of the pair of cover inner wall surfaces 122 along the hole in the design surface 121. The pair of cover inner wall surfaces 122 is formed substantially plane-symmetrically, and four crushed ribs 122*a* on each of the cover inner wall surfaces 122, eight crushed ribs 122*a* in total, are formed in pairs in symmetrical locations on the pair of cover inner wall surfaces 122. This increases stability and prevents instability of the design cover 120 while facilitating center alignment.

The lock hole elements 123 are flexible. Four lock hole elements 123 are more outwardly than the cover inner wall surfaces 122. The lock hole elements 123 are configured to engage the claws 113*a* on the outer wall 113 of the inlet housing 110 to fix the design cover 120 to inlet housing 110. Since the design cover 120 of the charging inlet 100 according to the present embodiment is provided with the crushed ribs 122*a* which are in contact with the socket section wall surface 112 of the inlet housing 110, this may prevent eccentricity of the design cover 120 and maintain balance of locking of the snap fit mechanism.

Figure 4:
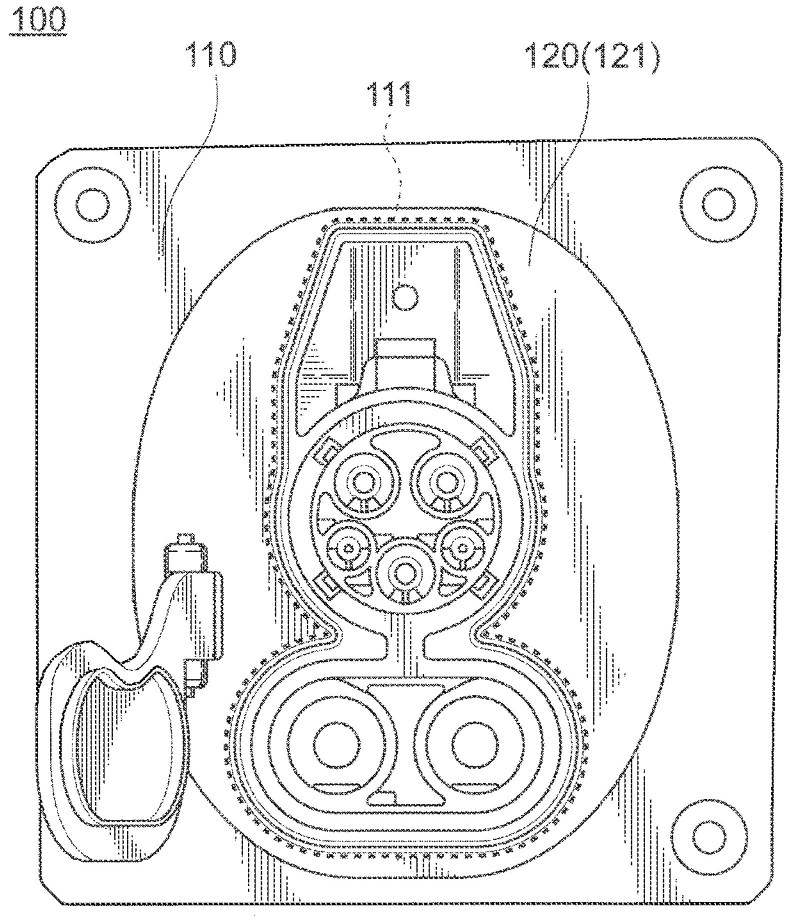
FIG. 4 shows a top view of the charging inlet according to the embodiment.

FIG. 4 shows a top view of the charging inlet 100 according to the present embodiment. For assembling the charging inlet 100, the design cover 120 with the crushed ribs 122*a* being uncrushed is fitted into the inlet housing 110 so as to cover the circumferential outer region 114 of the inlet housing 110 by the design surface 121.

The cover inner wall surface 122 of the design cover 120 then faces the socket section wall surface 112 of the inlet housing 110, wherein further fitting the design cover 120 into the inlet housing 110 brings each of the crushed ribs 122*a* into contact with the socket section wall surface 112 to crush the crushed ribs 122*a*. The claws 113*a* of the inlet housing 110 are then locked in the lock hole elements 123 of the design cover 120 to fix the design cover 120 to the inlet housing 110 so that assembly of the charging inlet 100 is completed. Since a gap is ensured between the design cover 120 and the inlet housing 110 during the assembly, the assemblability may not be deteriorated.

The charging inlet 100 according to the present embodiment after the assembly process as described above has a uniform gap between the design cover 120 and the inlet housing 110, and this state is stabilized. Particularly, the charging inlet 100 maintains a uniform gap (indicated by a dashed line in FIG. 4) between the socket section 111 and the design surface 121 which is easily noticeable, and therefore, deterioration of the design can be prevented.

Figure 5:
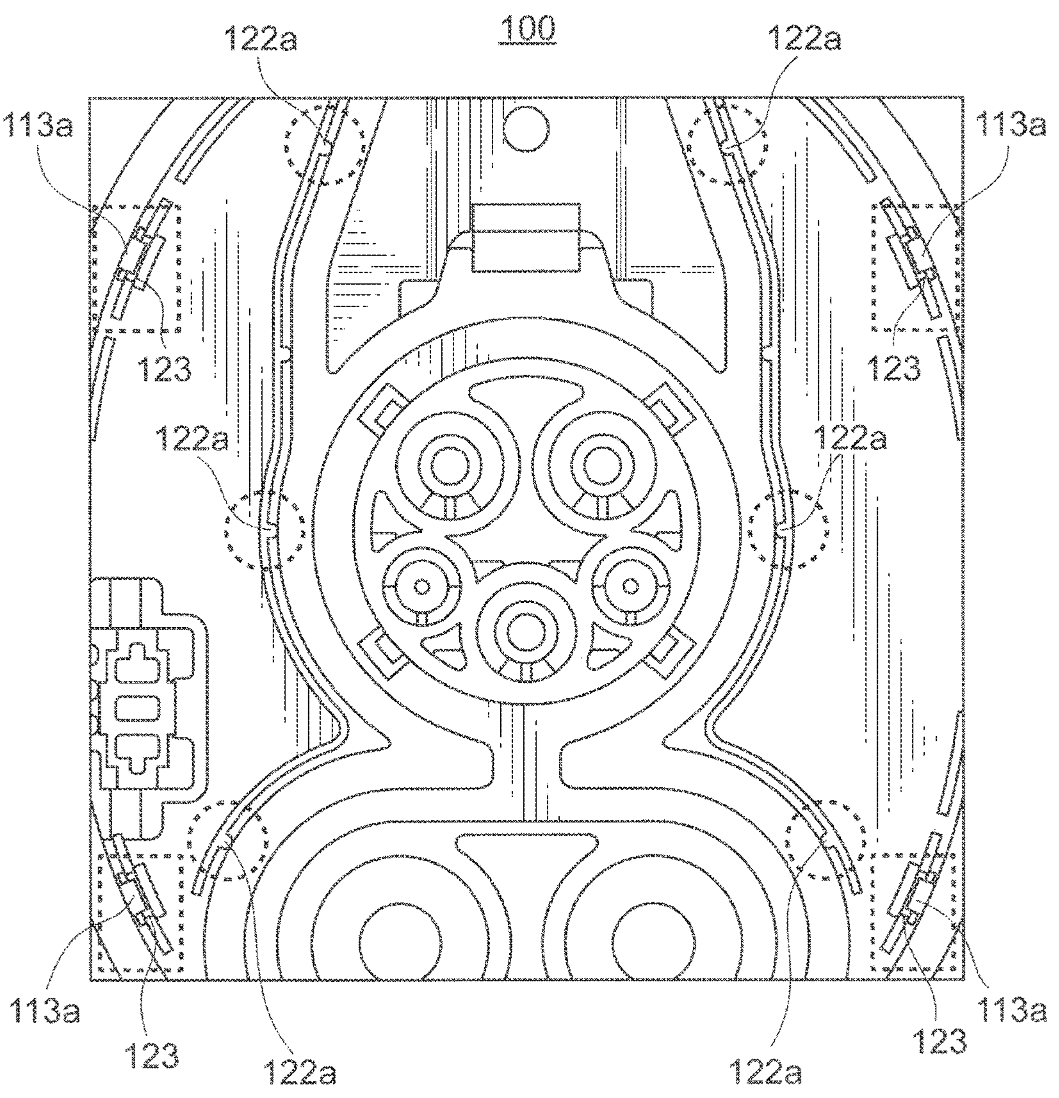
FIG. 5 shows a partial sectional view of the charging inlet directly below a design surface according to the embodiment.
Figure 6:
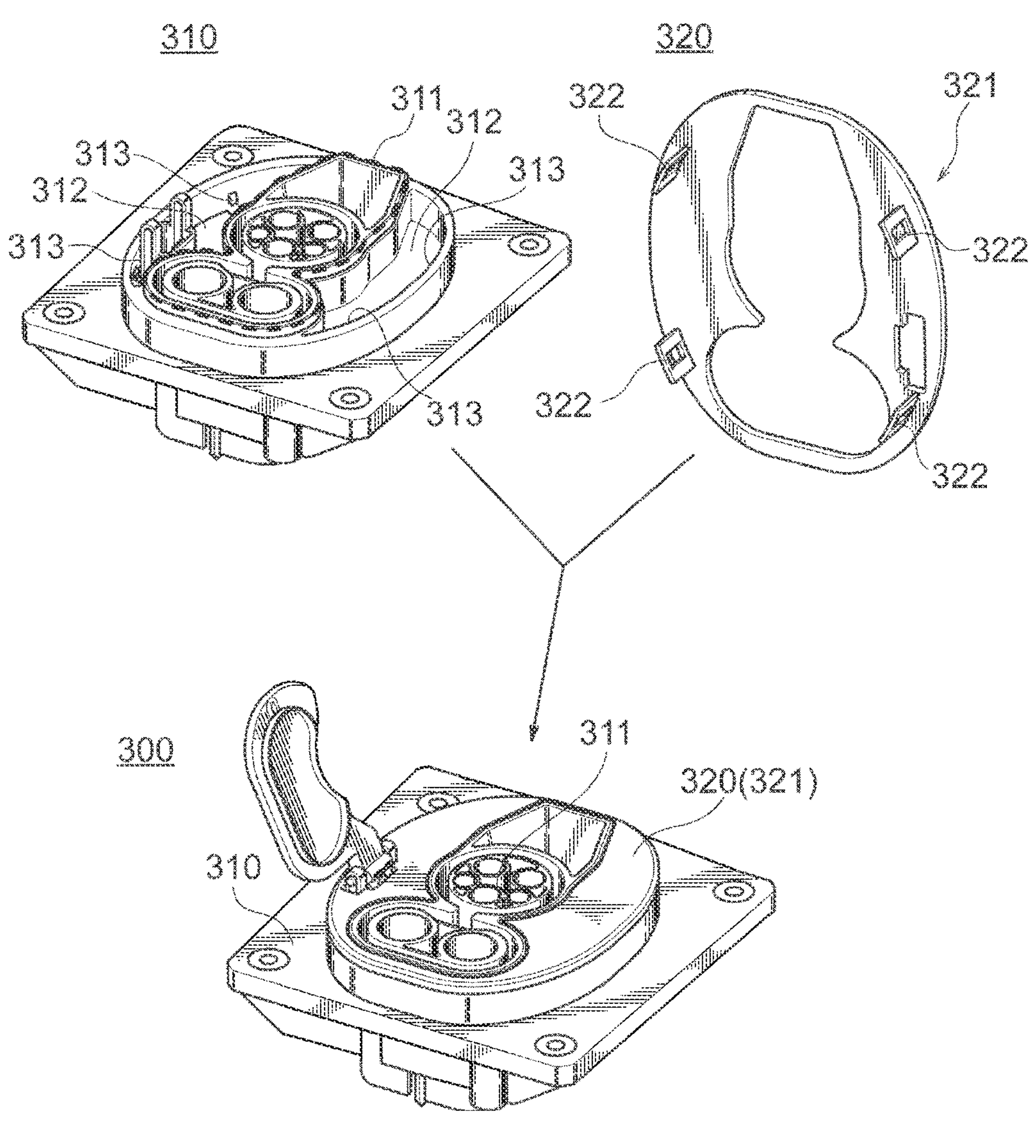
FIG. 6 shows a charging inlet with an inlet housing and a design cover.

FIG. 5 shows a partial sectional view of the charging inlet 100 according to the present embodiment directly below the design surface 121 of the design cover 120 along a section plane parallel to the design surface 121. As shown in this figure, the crushed ribs 122*a* of the charging inlet 100 according to the present embodiment are always in contact with the socket section wall surface 112 (as indicated by dashed circles in the figure), whereby the center alignment state is stabilized.

In this manner, the charging inlet 100 according to the present embodiment enables abnormal noises due to instability of the design cover 120 to be prevented. Further, the design cover 120 is prevented from being displaced to one side as described above, whereby it is also possible to prevent deterioration of the design of the charging inlet 100 due to an ununiform gap. Since the balance of engaged portions of the snap fit mechanism with the lock hole elements 123 and claws 113*a* is maintained by the center alignment (indicated by dashed rectangles in FIG. 5), it is also possible to prevent the holding force of the lock from being reduced. In addition, a stress acting toward an outer circumference of the design cover 120 is applied to the design cover 120 by the contact of the crushed ribs 122*a* with the socket section wall surface 112. Since the lock hole elements 123 is formed more outwardly than cover inner wall surface 122, a force acting in a direction in which the lock strength is increased is applied to the design cover 120.

Although the present embodiment provides the lock holes in the design cover 120 and the lock claws on the inlet housing 110 as the snap fit mechanism, it is to be noted that the lock claws may be on the design cover 120 and the lock holes may be in the inlet housing 110, or the lock claws may be on both of the design cover 120 and inlet housing 110.

Furthermore, although the design surface 121 according to the present embodiment is formed in a plate shape and the cover inner wall surface 122 extends upward from the back surface of the design surface 121, the design surface 121 may have a larger thickness and its lateral surface may form the cover inner wall surface 122.

As described above, the charging inlet 100 according to the present embodiment may improve the stability of the design cover against the inlet housing without deteriorating the assemblability.

REFERENCE SIGNS LIST

100 Charging inlet
110 Inlet housing
111 Socket section
111*a* AC socket
111*b* DC socket
112 Socket section wall surface
113 Outer wall
113*a* Claws
114 Circumferential outer region
120 Design cover
121 Design surface
122 Cover inner wall surface
122*a* Crushed ribs
123 Lock hole elements

What is claimed is:

1. A charging inlet comprising:

an inlet housing including a connection mechanism and a connection mechanism wall surface surrounding the connection mechanism, the connection mechanism being configured for connection to a partner connector; and a design cover including a design surface and a cover inner wall surface, the design surface having a hole in which the connection mechanism being exposed, wherein the cover inner wall surface faces the connection mechanism wall surface and the design cover is attached to the inlet housing with the design surface covering a circumferential outer region of the connection mechanism, wherein a plurality of crushed ribs is provided on the cover inner wall surface, the crushed ribs being in contact with the connection mechanism wall surface.

2. The charging inlet according to claim 1, wherein the design cover is fixed to the inlet housing by means of a snap fit mechanism with a flexible lock element which is positioned more outwardly than the cover inner wall surface.

3. The charging inlet according to claim 1, wherein a pair of cover inner wall surfaces is formed such that the connection mechanism is interposed between the pair of cover inner wall surfaces, and wherein a pair of crushed ribs is provided, one of the pair of crushed ribs being disposed in a first location of one of the pair of cover inner wall surfaces and another of the pair of crushed ribs being disposed in a second location of another of the pair of cover inner wall surfaces, the second location corresponding to the first location.

4. The charging inlet according to claim 3, wherein a plurality of crushed ribs is provided on each of the pair of cover inner wall surfaces.

5. A method of assembling the charging inlet according to claim 1, comprising:

fitting a design cover into an inlet housing, the inlet housing including a connection mechanism and a connection mechanism wall surface surrounding the connection mechanism, wherein connection mechanism is configured for connection to a partner connector, wherein the design cover includes a design surface and a cover inner wall surface, wherein the design surface has a hole for exposing the connection mechanism and the cover inner wall surface includes a plurality of ribs, wherein the fitting the design cover into the inlet housing is performed such that the design surface covers a circumferential outer region of the connection mechanism and the cover inner wall surface faces the connection mechanism wall surface to crush the plurality of the ribs via contact of the plurality of ribs with the connection mechanism wall surface.

* * * * *